Dec. 2, 1947. R. E. ENGBERG Re. 22,945

APPARATUS FOR DISPENSING GUMMED TAPE

Original Filed Sept. 15, 1938 5 Sheets-Sheet 1

Ralph E. Engberg Inventor

By Warren W. House

His Attorney

Dec. 2, 1947. R. E. ENGBERG Re. 22,945

APPARATUS FOR DISPENSING GUMMED TAPE

Original Filed Sept. 15, 1938 5 Sheets-Sheet 2

Inventor

Ralph E. Engberg

By Warren D. House

His Attorney

Dec. 2, 1947. R. E. ENGBERG Re. 22,945

APPARATUS FOR DISPENSING GUMMED TAPE

Original Filed Sept. 15, 1938 5 Sheets-Sheet 3

INVENTOR.

By Ralph E. Engberg
Warren D. House
His Attorney.

Dec. 2, 1947. R. E. ENGBERG Re. 22,945

APPARATUS FOR DISPENSING GUMMED TAPE

Original Filed Sept. 15, 1938 5 Sheets-Sheet 4

INVENTOR.

Ralph E. Engberg

By Warren W. House.

His Attorney.

Dec. 2, 1947. R. E. ENGBERG Re. 22,945

APPARATUS FOR DISPENSING GUMMED TAPE

Original Filed Sept. 15, 1938 5 Sheets-Sheet 5

INVENTOR.
Ralph E. Engberg.
By Warren D. House.
His Attorney.

Reissued Dec. 2, 1947 Re. 22,945

UNITED STATES PATENT OFFICE 22,945

APPARATUS FOR DISPENSING GUMMED TAPE

Ralph E. Engberg, Clayton, Mo., assignor to Better Packages, Inc., Shelton, Conn., a corporation of New York Original No. 2,241,658, dated May 13, 1941, Serial No. 229,999, September 15, 1938. Application for reissue April 15, 1942, Serial No. 439,139

26 Claims. (Cl. 164—43)

My invention relates to improvements in methods of and apparatus for dispensing gummed tape.

It is particularly well adapted for feeding and dispensing in severed portions, in predetermined lengths, of gummed tape of a character that does not require moistening to make it adhere, one type of tape of this character being known in the market as "Scotch" tape.

One of the objects of my invention is the provision of a novel method of dispensing the tape causing it to adhere to carriers spaced apart one in front of the other, and advancing the carriers simultaneously along an orbit past a point of delivery, and detaching the tape successively from the carriers at the point of delivery, the carriers after detachment while traveling in their orbit reengaging a following portion of the tape.

My improved method further provides for the severing successively into predetermined lengths of the advance portions of the tape that is being fed.

A further object of my invention is the provision of a novel apparatus by which my improved method is brought into effect, which apparatus includes an endless traveling belt having novel means for adhesively engaging and propelling to a point of delivery a strip of gummed tape, drawn, as it is propelled, from a roll.

My improved apparatus further provides novel means by which the tape propelling belt is driven step by step in consecutive feeding movements a predetermined distance at each step.

My invention has another object in the provision of novel means for adjustably controlling the belt driving means by which the advance of the belt at each step may be varied as to distance.

A further object of my invention is the provision of novel means for severing the advance portions of the tape from that following.

A further object of my invention is to provide for stripping a severed strip from all but one of the tape carriers at the point of delivery, so that the tape issues from the machine at an angle to the orbit of travel of the carriers and can easily be removed from the single carrier to which it remains adhesively secured until removed.

Still another object of my invention is the provision of a novel apparatus of the kind described, which is relatively simple, which can be economically manufactured and operated, which is durable, and not likely to get out of order, and which is efficient in operation.

The novel features of my invention are hereinafter fully described and claimed.

In the accompanying drawings which illustrate my improved apparatus,

Similar characters of reference designate similar parts in the different views.

Figure 1:
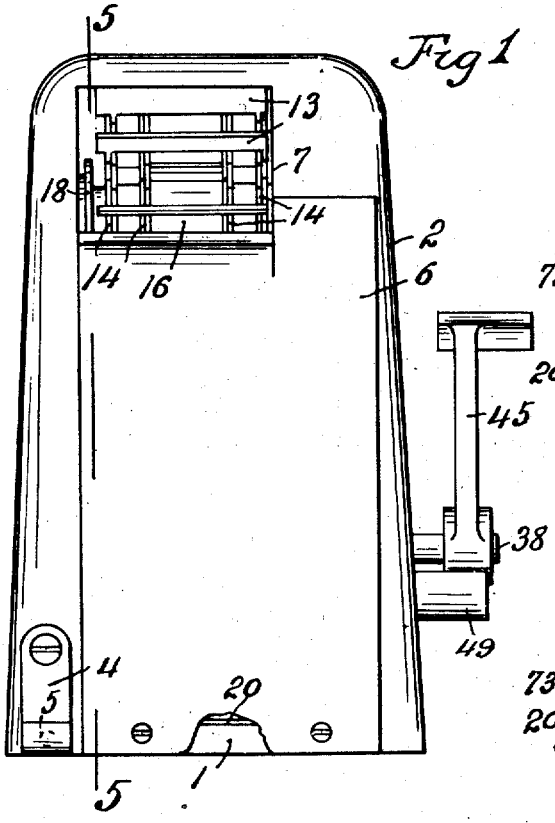
Fig. 1 is a front elevation of the apparatus.
Figure 2:
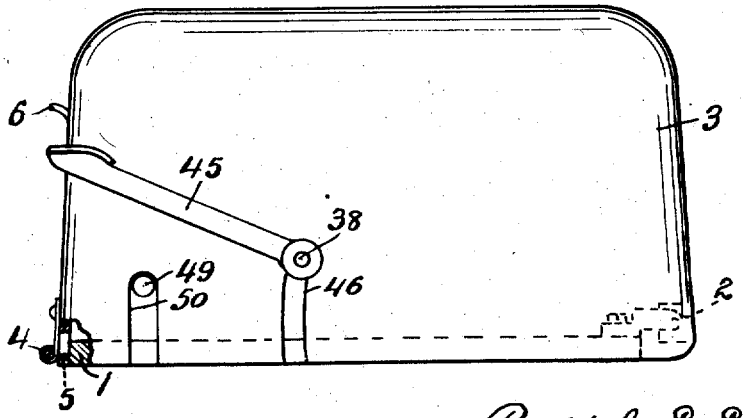
Fig. 2 is a reduced side elevation of the same.

The apparatus is provided with an enclosing casing having a base 1 to the rear end of which is hinged at 2 a box like cover 3, the front end of which has a catch 4 adapted to releasably engage a stud 5 projecting forwardly from the front edge of the base 1, Figs. 1 and 2.

The base 1 has extending upwardly from its front edge a wall 6, which partly closes a front opening 7 in the front wall of the cover 3. The upper end of the front wall 6 is upwardly and forwardly curved and is disposed at the point of delivery of the gummed tape 8, the upper end of the opening 7 serving as a discharge opening for the tape, Figs. 1, 5 and 6.

The gummed tape 8 is, preferably, of a type having a gummed side of a character that will adhere without moistening to metal. A gummed tape of this character is commercially known as "Scotch" tape. The tape to be used is wound to form a roll 9, having the gummed side in, the roll 9 being mounted on a drum 10 having an axial shaft 10' removably rotatably mounted in notches 11 in the upper ends of the arms of a U shaped support 12, the transverse part of which is fastened to the upper side of the base 1 adjacent to the rear end thereof, Figs. 5 and 6.

For feeding the tape 8 forwardly from the roll 9, a carrying device is provided having carriers which are adapted to adhesively engage the gummed side of the tape 8 and propel it forwardly to the point of delivery comprising the part of the opening 7 above the front wall 6. These carriers are spaced apart one in front of the other and travel in the same path along a common orbit, and, in the form shown, comprise transverse blades 13, provided on the periphery of an endless belt consisting of two parallel endless link belt sections 14, the blades 13 being rigidly fastened at their inner edges to the outer edges respectively of the links of the belt sections 14, Figs. 1, 5, 6, 8 and 11.

The link belt sections 14 are mounted on two rotary toothed drums 15 and 16, the drum 15 of the larger diameter, being located forward of the drum 10, and the drum 16, of much smaller diameter, being located forward of and higher than the drum 15, and at the rear of and closely adjacent to the upper end of the front wall 6, Figs. 1, 5, 6 and 8.

The larger drum 15 is rigidly fastened on a transverse axial shaft 17 rotatably mounted in the two side walls 18 and 19 of a U shaped sheet metal support, the transverse part 20 of which is fastened to the top of the base 1 between the the front wall 6 and the support 12, which supports the roll carrying drum 10.

The smaller drum 16 is rotatably mounted on a transverse shaft 21, provided in its ends respectively with axial holes in which are fitted two screws 22 and 23. The end portions of the shaft 21 are respectively forwardly and rearwardly adjustable in two longitudinal slots 24 and 25, respectively provided in the side walls 18 and 19. The heads of the screws 22 and 23 respectively bear against washers 26 and 27, which, when the screws 22 and 23 are tightened, clamp against the outer sides respectively of the side walls 18 and 19, thus holding the shaft 21 in the position to which it may be adjusted, for properly tightening the link belt sections 14.

The larger drum 15 has at its ends two annular rows of cogs 28 which respectively engage and drive the link belt sections 14, when the drum shaft 17 is rotated. The smaller drum 16 has at its ends two annular rows of cogs 29, which engage the link belt sections 14 whereby the drum 16 is rotated, when the drum 15 drives the link belt sections 14, to propel forwardly the tape 8 by means of the blades 13 which have their outer edges in adhesive engagement with the gummed side of the tape 8, Figs. 5, 6, 7, 8 and 11.

Figure 7:
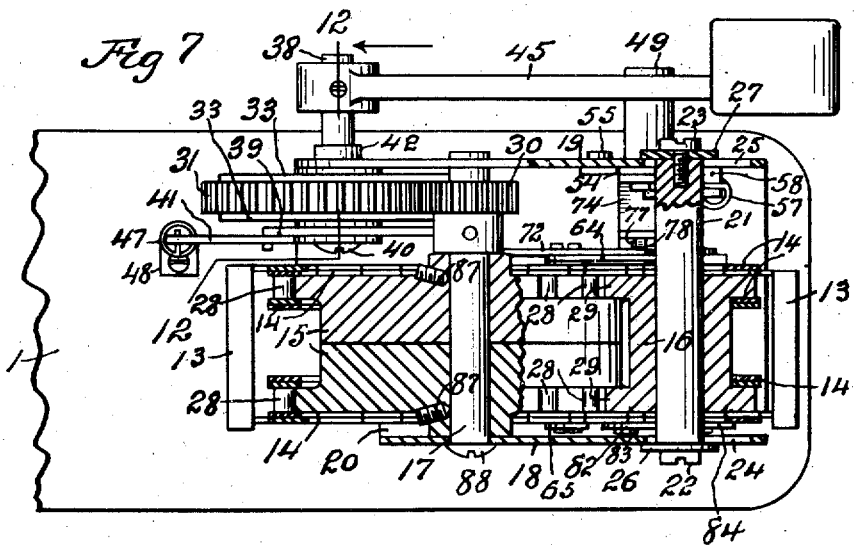
Fig. 7 is a fragmental view showing some of the parts in plan and others partly broken away and some omitted, and showing portions of the belt driving mechanism.
Figure 12:
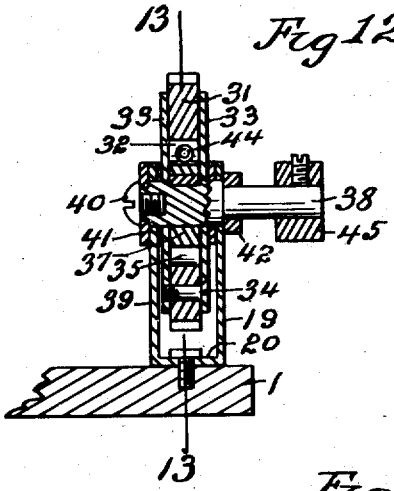
Fig. 12 is a vertical section on the line 12—12 of Fig. 7, showing the clutch mechanism forming part of the belt driving mechanism.
Figure 13:
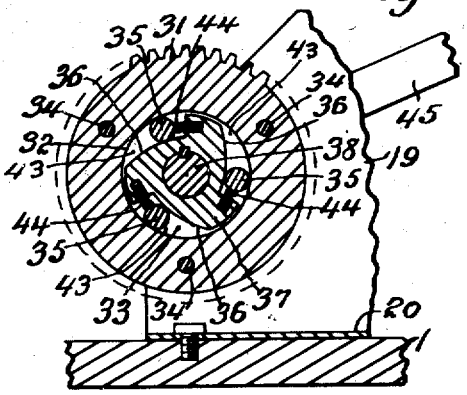
Fig. 13 is a vertical section on the plane of the line 13—13 of Fig. 12, showing the interior of the clutch.

For rotating the shaft 17 of the larger drum 15 in the proper direction, it has fastened rigidly on it a pinion 30, Fig. 7, which meshes with a spur gear wheel 31, which is driven in step by step movements consecutively by a clutch, shown in Figs. 12 and 13, that permits the gear 31 to freely revolve in the proper feeding direction, but which prevents it from reversely turning.

The gear wheel 31 has transversely through it an axial circular hole 32 normally closed at its ends by two circular plates 33, detachably fastened to opposite ends of the gear 31 by removable screws 34.

The clutch comprises three transverse rollers 35 respectively revoluble on three cam surfaces 36 provided on the periphery of a clutch member 37 keyed on a transverse rock shaft 38 oscillatively mounted in the side wall 19 and a wall 39 extending upwardly from the transverse part 20, Figs. 6, 7, 12 and 13.

For holding the rock shaft 38 from endwise movement it has in its inner end a theaded hole in which is fitted a screw 40, the head of which bears against a lever 41 which bears against the outer side of the wall 39. A collar 42 fastened on the rock shaft 38 bears against the outer side of the side wall 19.

The cam surfaces 36 form with the inner wall of the gear wheel 31 outwardly converging recesses 43, in which the three rollers 35 are normally respectively forced outwardly into holding engagement with the inner wall of the gear 31, by three coil springs 44 mounted respectively in three holes in the clutch member 37.

When the rock shaft 38 is turned clockwise, as viewed in Fig. 13, the rollers 35 will lockingly engage the gear 31 and turn it in a like direction, thus forwardly propelling the tape 8 by means of the blades 13 engaged therewith, the link belt sections 14, the larger drum 15, the shaft 17 and the pinion 20 engaged with the gear 31.

For rocking the rock shaft 38 to consecutively properly rotate the gear 31 step by step by means of the clutch, just above described, there is provided an oscillative lever 45, which is rigidly fastended to the rock shaft 38, at the outer side of the cover 3, and which extends forwardly and upwardly, normally, from the rock shaft 38. The rock shaft 38 extends through a slot 46, which extends upwardly from the lower edge of the adjacent side of the cover 3, and which slot permits the cover 3 being swung upwardly from its closed position, shown in Fig. 2.

Figure 5:
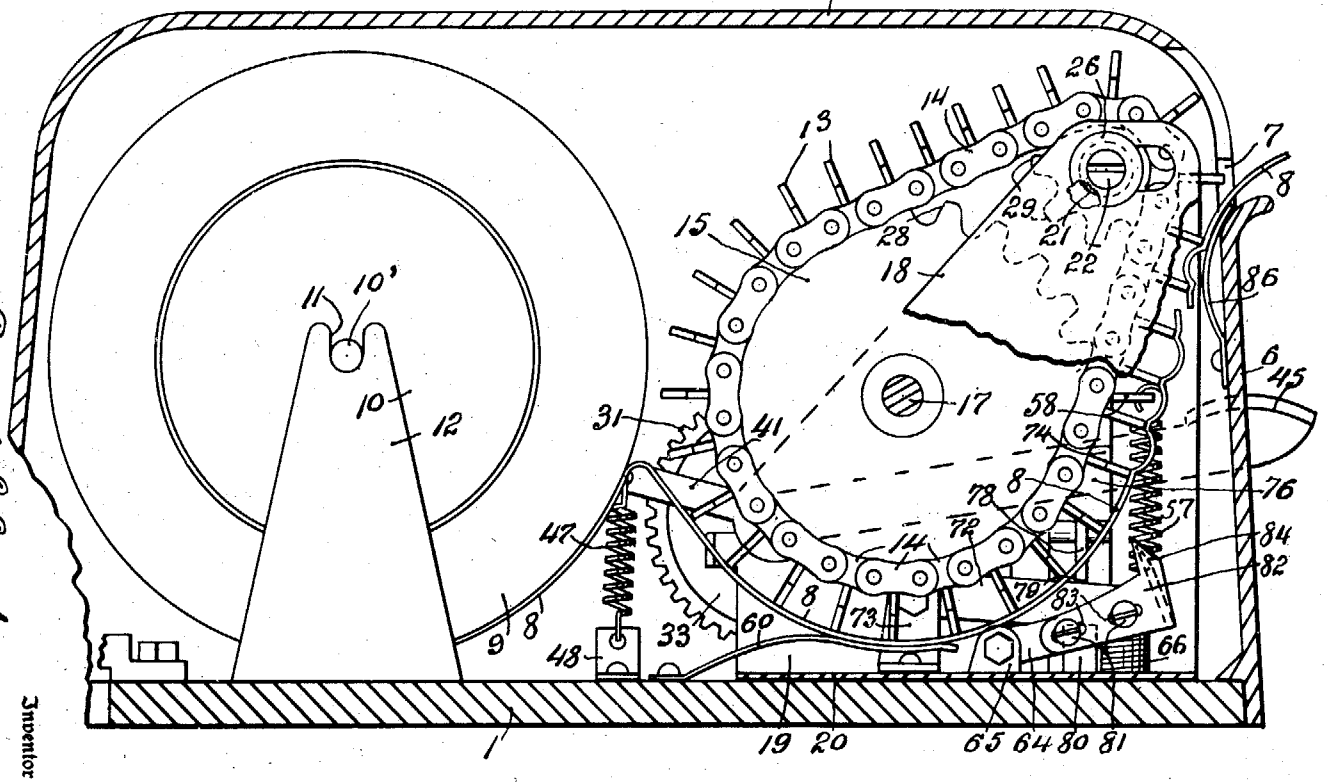
Fig. 5 is a vertical sectional view on the line 5—5 of Fig. 1, parts being broken away, showing an advance portion of the tape as having been severed and extending outwardly through the tape discharge opening, and as having been detached from some of the blades, and showing the knife as fully depressed and about to be released.
Figure 6:
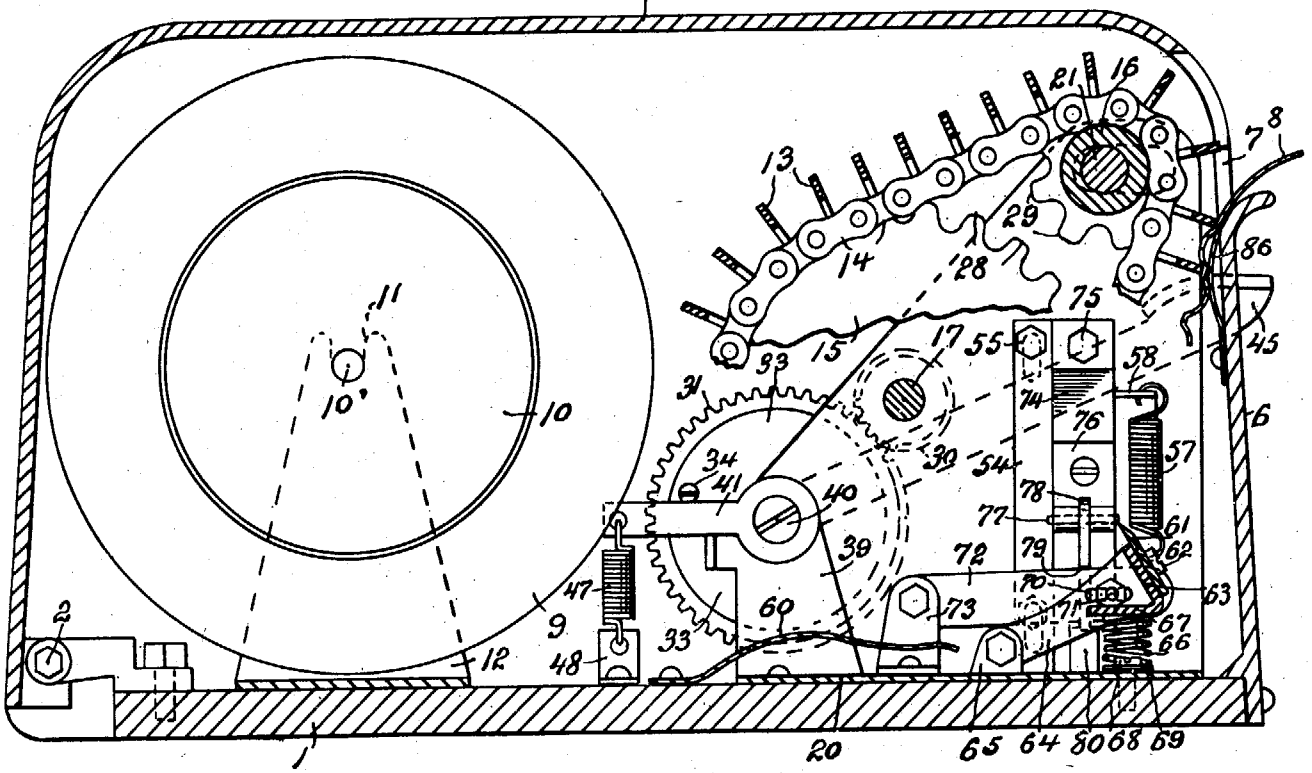
Fig. 6 is a vertical longitudinal sectional view of the apparatus, parts being broken away and some omitted, and showing the knife prior to its depression.

The lever 41, which is rigidly fastened to the inner end of the rock shaft 38, extends rearwardly therefrom, and has fastened to its rear end the upper end of a coil spring 47, the lower end of which is fastened to an angle plate 48 fastened to the top of the base 1, Fig. 6. This spring 47 normally swings the lever 41 downwardly, thus, through the rock shaft 38 swinging the lever 45 to the upper position, shown in Figs. 5 and 6.

To drive the tape advancing belt so as to feed the tape 8 forwardly, the lever 45 is depressed, and the distance that it is depressed determines the distance that the tape 8 is advanced at a step. For adjustably regulating the distance that the lever 45 can be depressed, there is provided a transverse stop bar 49, Figs. 1, 2, 7, 9, 10 and 11, which extends through a slot 50 that extends upwardly from the lower edge of the right hand side wall of the cover 3.

The stop bar 49 has adjacent to its inner end a diamond shaped portion 51 the front and rear ends of which are adapted to be fitted in opposite pairs of notches 52 provided in opposite edges of a vertical slot 53 in the vertical outer portion 54 of a plate, which portion is vertically slidable against the inner side of the side wall 19, against which it is held by screws 55 extending through slots 56 in the side wall 19.

A vertical coil spring 57 has its upper end fastened to a projection 58 on the inner side of the wall 19, the lower end of the spring being fastened to a hook 59 on the portion 54 of the slidable plate. The tension of the spring 57 normally forces the plate portion 54 upwardly against the projection 58, Figs. 10 and 11.

The operating hand lever 45 when depressed strikes the stop bar 49, and forces the latter with the plate portion 54 downwardly until the latter is stopped by the screws 55 reach the lower ends of the slots 56, when the depression of the lever ceases. By adjusting the stop bar in different pairs of the notches 52, the distance of depression of the operating lever 45 may be varied to suit the distance that it is desired to feed the tape 8 step by step.

Figure 8:
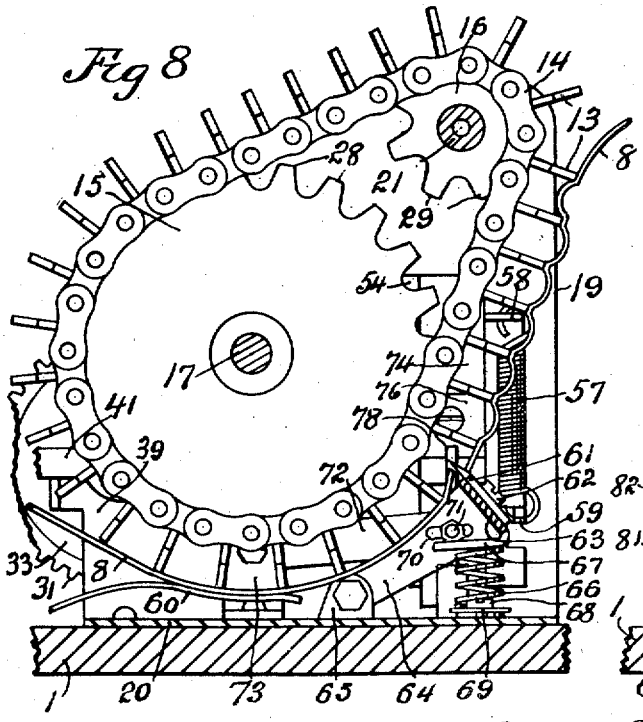
Fig. 8 is a longitudinal view of a portion of the apparatus, partly in side elevation and partly in vertical section, parts being broken away and other parts omitted, and showing the knife in the tape severing position.

For pressing the tape 8 against the blades 13, a flat spring 60 is fastened at one end to the top of the base 1, and the upper side of the front portion of the spring bears against the under side of the tape 8, Figs. 5, 6 and 8.

As the drum 16 is much smaller in diameter than the drum 15, when the blades 13 consecutively reach the point of delivery of the tape, at the rear of the upper end of the front wall 6, the blades will each spread apart from the one next following, thereby causing the spread blade to detach itself from the tape, which then passes out of the discharge opening 7 above the wall 6, Figs. 5, 6 and 8.

Thus when a severed strip of tape approaches the delivery point, it will be successively detached from the carriers until it is presented, extending from the opening 7 at an angle to the orbit of travel of the carriers 13 and held in the machine by adhesive connection with but one of the carriers 13.

For severing the tape 8 between two of the blades 13 after each step of advancement of the tape has been completed, there is provided a knife having a cutting blade 61, Figs. 3, 4, 5, 6, 8, 9, 11, 14 and 15, having a forwardly converging cutting edge, the blade being fastened by screws 62 to the transverse portion 63 of a U-shaped support, the arms 64 of which are pivoted to two projections 65 extending upwardly from the plate portion 20 under the drum 15.

The projections 65 are so disposed that, when the arms 64 are swung upwardly until their curved upper edges strike the under side of the tape 8, as shown in Fig. 8, the blade 61 will pass through and sever the tape 8 between the two next adjacent blades 13.

When the knife is depressed and then released suddenly, it will be swung upwardly to the cutting position, shown in Fig. 8, by a coil spring 66, the upper end of which bears against the under side of an arm 67 extending rearwardly from the transverse portion 63 of the blade support, the lower end of the spring 66 encircling a screw 68 the head of which bears on a washer 69, which supports the lower end of the spring 66.

For depressing and then releasing the U-shaped support 63—64 of the cutting blade, one of the arms 64, Fig. 8, is provided with a slot 70 through which extends a screw 71 mounted in the forward end of a forwardly and rearwardly extending lever 72, the rear end of which is pivoted to an angle plate 73 fastened to the top of the plate 20, Figs. 3, 4, 5, 6, 8, 9, 11 and 14.

Figure 9:
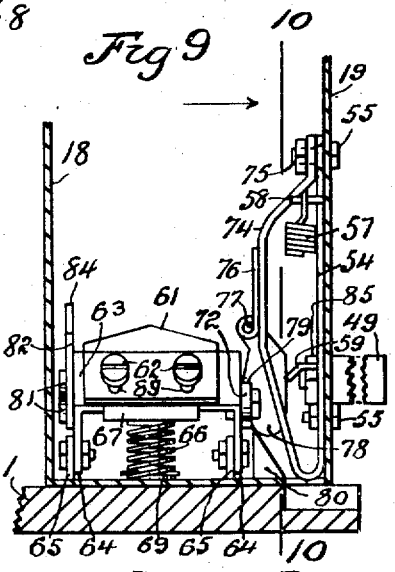
Fig. 9 is a fragmental view partly in transverse vertical section and partly in elevation, parts being broken away and parts omitted, and showing the knife and its operating mechanism prior to the knife being depressed before a tape cutting operation.
Figure 10:
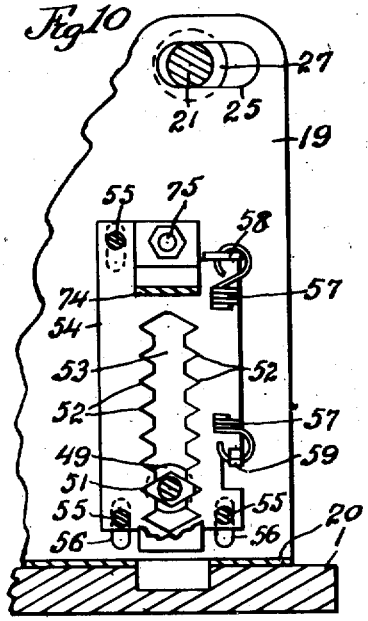
Fig. 10 is a vertical sectional view on the plane of the line 10—10 of Fig. 9, showing the adjustable mechanism which limits the stroke of the operating lever.
Figure 11:
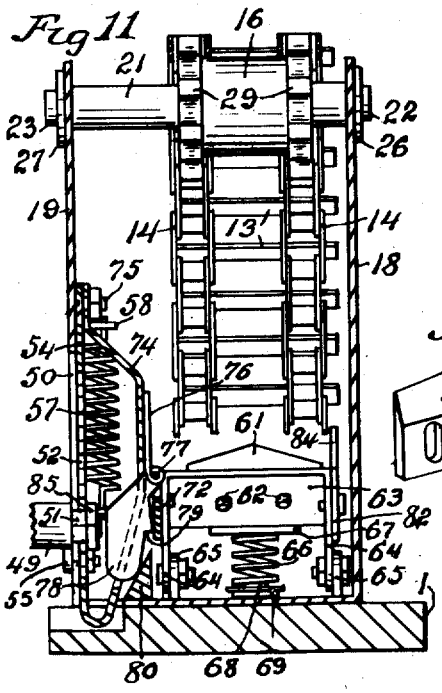
Fig. 11 is a fragmental view looking toward the front, partly in rear elevation, and partly in transverse vertical section, parts being broken away and parts omitted, and showing the slidable knife depressing mechanism, as depressed and as having released the knife operating lever, and the latter and the knife in the uppermost cutting position.

The vertically slidable plate 54 has extending upwardly from its lower end an arm 74, Figs. 9 and 11, the upper end of the arm being fastened to the upper end of the plate 54 by a screw 75, Figs. 10 and 11. The arm 74 has fastened to it a hinge member 76, to which is pivoted by a pintle 77 the upper end of a pawl 78, Figs. 9 and 11, which has a tooth 79 which normally engages the upper edge of the lever 72.

When the operating lever 45 is depressed and engages the stop bar 49 which depresses the plate 54, the arm 74 will also be depressed, and will cause the pawl 78 to swing downwardly the lever 72, thus depressing the knife support 63—64, and compressing the coil spring 66. Before the arm 74 reaches the end of its down stroke, the pawl 78 will engage the outer inclined edge of a projection 80 on the plate 20, and will be detached from the lever 72, which will be released from the pawl 78.

The compressed coil spring 66 will then suddenly swing upwardly the knife supports 63—64 causing the cutting blade 61 to sever the tape, as shown in Fig. 8.

Figure 3:
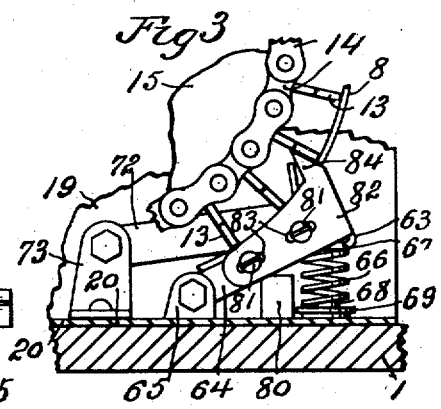
Fig. 3 is a fragmental side view, partly in elevation and partly in vertical section, showing the knife guard engaged with one side of a blade, while the knife has severed the tape.
Figure 4:
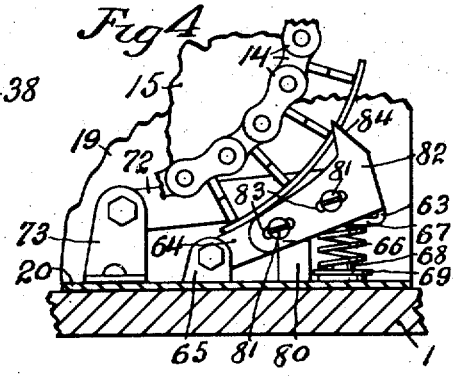
Fig. 4 is a view similar to Fig. 3, showing the knife guard engaged with the other side of a blade prior to the knife engaging the tape.

To prevent the cutting blade 61 having its cutting edge strike one of the tape feeding blades 13, during a tape cutting operation, one of the arms 64 of the knife support has fastened to it by screws 81, Fig. 5, a guard plate 82, having two slots 83 through which the screws 81 extend. The guard plate 82 has at its upper and forward end an angular tooth 84, which projects beyond the cutting edge of the blade 61, and is adapted to engage a blade 13 at either side, as shown in Figs. 3 and 4, thus pushing the blade struck out of the path of the cutting blade 61. By loosening the screws 83, the guard 82 may be adjusted.

After the knife has cut the tape it will resume its normal position, shown in Fig. 6, its position, when the spring 66 is compressed, being shown in Fig. 5, and its cutting position being shown in Figs. 3 and 8.

When the operating lever 45 is again depressed, the belt having the blades 13 will be again advanced, as has been described, and the tape 8 will again be advanced a step, and another length thereof will be severed from that following. The length of tape which has previously been severed, will be advanced by the blades 13 to which it is still attached, and will finally be freed from all but one of these blades, as has been described. The operator by then pulling on the advanced severed portion will detach it from the blade to which it has still adhered.

When it is desired to change the distance the tape is fed at each step, to a shorter distance, the stop bar 49 has its diamond shaped portion 51 withdrawn from the notches 52 in which the portion 51 has been disposed. The portion 51 is then inserted into two notches 52 that are higher. The stop bar 49 is retained in its adjusted position by means of a nut 85 on the threaded inner end of the stop bar 49, said nut bearing against the inner end of the diamond shaped portion 51 and against the inner side of the plate 54, the stop bar 49 having a sliding bearing against the outer side of the side wall 19.

From the foregoing description, it will be understood that upon the depression of the lever 45, the rock shaft 38 through the clutch will turn the gear 31, thereby, through the pinion 30, revolving the shaft 17, which in turn drives the endless belt, which, through the blades 13 feeds the tape 8 to the discharge opening, where the tape, as it is advanced, consecutively detaches from the blades 13.

When the lever 45 is depressed, it strikes the stop bar 49 which is depressed with the lever 45, thereby depressing the slide plate 54 and with it the pawl 78, the latter swinging the lever 72 downwardly, thus swinging downwardly the knife which, in turn, compresses the coil spring 66. When the pawl 78 in its downward movement engages the inclined edge of the projection 80, the latter will detach the pawl tooth 79 from the lever 72, upon which the compressed spring 66 will swing upwardly the cutting blade support 63—64, which will carry the blade 61 to the tape severing position between two of the blades 13.

When the stop bar 49 has forced the plate 54 to its lowermost position, the downward movement of the operating lever 45 will cease, and the latter on being released will be upwardly retracted to its normal uppermost position, by means of the coil spring 47.

If at any time it is desired to feed longer lengths of tape than the stop bar 49 is set for, this may be effected by successively oscillating the lever 45 without depressing it sufficiently to operate the knife.

As will be seen in Fig. 5, the tape 8, as it is fed forwardly by the blades 13, will peel from the roll 9, and the blades 13 in traveling along their orbit will, after their detachment from the tape at the point of delivery, adhesively reengage following portions of the tape.

When a roll of tape has been fed from the apparatus, the catch 4 is released from the stud 5, and the cover 3 swung upwardly and rearwardly to the open position. The drum 10, with its shaft 10′ is then removed and another tape roll 9 mounted on the drum. The drum 10 is then replaced in its operative position on the support, following which a portion of the tape 8 is withdrawn from the roll 9, and inserted between the spring plate 60 and the adjacent blades 13, the outer edges of which adhesively engage the gummed side of the tape 8. The tape 8 is then fed forwardly by consecutive steps, and the advance portions severed between the steps, from that following, in the manner hereinbefore described.

For holding the severed portion of the tape 8 against the rearmost blade 13, to which it is attached, while the blade 13 next forward is spreading apart from said rearmost one, there is provided a curved spring plate 86, Fig. 5, and Fig. 6, which is fastened at its lower end to the rear side of the front wall 6 and extending upwardly to the curved upper end of said wall, and which tightly presses the tape 8 against the blades 13 as the latter consecutively near the upper end of the wall 6. By this means, as the blades 13 consecutively arrive at the place where they spread at their outer edges from those following, the tape will be detached from the spreading blades.

As is shown in Fig. 7, the drum 15 is composed of two end halves, which respectively abut against the hub of the pinion 30 and the side wall 18, two screws 87 in the said halves tightly engaging the shaft 17, the end of which adjacent to the side wall 18 has an axial threaded hole in which is fitted a screw 88, which engages the outer side of the side wall 18, and holds the shaft 17 from endwise movement towards the side wall 19.

Figure 15:
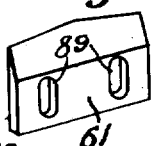
Fig. 15 is a perspective view of the knife blade.
Figure 14:
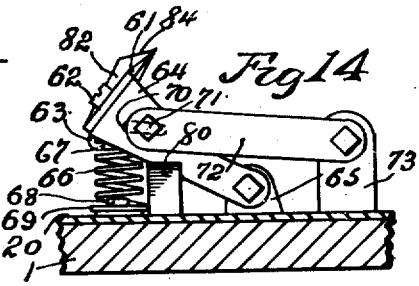
Fig. 14 is a side elevation of the knife and its operating lever, part of the base being shown in vertical section and the knife in the uppermost cutting position.

As shown in Fig. 9, and in Fig. 15, the knife blade 61 has two slots 89 transverse to the length of the blade, and through which slots the screws 62 extend respectively. This construction permits the blade 61 to be adjusted toward and from the tape 8.

It will be noted that the length of the spring 66 is such that after it has been compressed, as shown in Fig. 5, and then has expanded, as shown in Figs. 8 and 11, to force the knife blade 61 through the tape 8, it will contract, as shown in Figs. 6 and 9, to permit the knife to retract, after cutting the tape, to a normal position, in which the blade 61 will clear the tape, and the pawl 78 will again have its tooth 79 engage the upper edge of the lever 72, which will be effected by the gravity of the pawl, the spring 57 having lifted the plate 54—74, and with it the pawl 78 to permit of such engagement. By utilizing only the adhesiveness of the gummed tape, after it has been stuck to one or more of the carrier blades 13, for effecting its driving engagement with said blades, a relatively simple structure is provided for feeding the tape, which is particularly adapted for the proper feeding of tape of the "Scotch" type, that does not require moistening to make it adhere, and which eliminates much auxiliary means usually required to make the tape carriers have driving engagement with the tape, and which improved structure feeds the tape accurately and without slippage. One object in having the severed forward portions of the tape made to adhere to the blades 13 after being severed, is to keep short severed pieces of the tape under control until after they have reached the place of discharge and are ready to be automatically detached from the blades. Thus by adjusting the stroke of the feeding lever 45, pieces of tape one or two inches long, or less, may be severed from the strip and kept under control until they have been automatically discharged through the discharge opening 7.

Many modifications of my invention, within the scope of the appended claims, may be made without departing from the spirit of my invention.

I claim:

1. In an apparatus for feeding gummed tape, which adheres without moistening, the combination with means for feeding the tape which means includes an endless belt having around its periphery transverse spaced apart blades to the outer edges of which the gummed side of the tape is adapted to adhere without moistening, said means utilizing only the adhesiveness of the gum for driving engagement of the tape with said blades, means for driving said belt in one direction, means for engaging following portions of the tape with said blades as the latter travel in an orbit, means for detaching the tape from each of said blades when the blade reaches a predetermined point ahead, and means for severing the tape at the rear of and spaced from said point.

2. In an apparatus for feeding gummed tape which adheres without moistening, the combination with means for feeding the tape which means includes an endless belt having around its periphery transverse spaced apart blades to the outer edges of which the gummed side of the tape is adapted to adhere without moistening, said means utilizing only the adhesiveness of the gum for driving engagement of the tape with said blades, means for driving said belt step by step successively in one direction, means for engaging the gummed side of following portions of the tape with said blades as the latter travel in an orbit, means for detaching the tape from each of said blades as the blade reaches a predetermined point ahead, and means for successively severing forward end portions from the following portions of the tape.

3. An apparatus for serving sections of a strip of tacky material including a support for a roll of the material, a feeding and delivering element having a plurality of spaced supports for said strip having strip engaging surfaces, said strip being adapted to adhere to said strip engaging surfaces by means of its tackiness alone, said element being movable in a direction to draw strip material from the roll, a severing device to sever said material after it is drawn from the roll and means to produce relative movement between said spaced supports to disengage said severed strip from one of said supports and present it for removal adhesively secured to another of said supports.

4. In a device for withdrawing strips of tacky material from a supply roll, a support for the roll, a feeding and measuring element in the form of an endless belt having transverse strip engaging members adapted to engage the tacky side of the strip by means of its tackiness alone, said element being movable to withdraw strip from the roll and present it for removal detached from at least one of said transverse members.

5. In a device for withdrawing strips of tacky material from a supply roll, a support for the roll, a feeding and measuring element in the form of an endless belt having a plurality of transverse strip engaging members adapted to engage the tacky surface of the strip by means of its tackiness alone, said element being movable to withdraw strip from the roll and present it for removal with at least one of said strip engaging members adjacent the forward end of the strip disengaged from the strip.

6. In an apparatus for serving strips of tacky material, a support for a supply of material, a feeding and measuring element mounted adjacent thereto provided with a plurality of spaced transverse members having surfaces capable of contacting the tacky side of the strip, said element being movable in a direction to withdraw strip from the roll and said surfaces engaging the tacky side of the strip by its tackiness alone to draw strip from the roll when said element is moved, a severing device to sever said strip and means associated with said element to remove said severed strip from one of said strip engaging surfaces and present it for removal adhesively secured to another of said strip engaging surfaces.

7. In a device for withdrawing strips of tacky material from a supply roll, a feeding and measuring element having at least two spaced transverse strip engaging members adapted to engage the tacky side of the strip by means of its tackiness alone, said element having a withdrawing zone and a delivery zone through which said members are successively movable, said members engaging and suspending said strip between them at said withdrawing zone and being moved to a greater distance from each other at said delivery zone than at said withdrawing zone.

8. In a device for delivering strips of tacky material from a supply roll, a support for the roll, a feeding element having at least two spaced transverse supports movable in a direction to draw material from the roll and to which the material is adapted to adhere by its tackiness alone, means to sever the removed material and means to spread said supports away from each other whereby the adhesive contact of the severed material of one of said supports is broken and whereby the severed material is presented for removal from the machine adhesively secured to but one of said supports.

9. A device for delivering strips of tacky material from a supply roll including a support for a roll of the material, a feeding and measuring element mounted for orbital movement adjacent said roll and carrying at least two spaced transverse strip engaging supports, means to move said supports about the periphery of said orbit to draw strip from the roll by adhesive attachment to said supports and means for detaching said strip from one of said supports and presenting it at an angle to the periphery of said orbit for removal from the other of said supports.

10. An apparatus for serving sections of a strip of tacky material including a support for a roll of the material, a feeding and delivering element having a series of spaced supports for said strip having strip engaging surfaces, said strip being adapted to adhere to said surfaces by means of its tackiness alone, said element being movable in a direction to draw strip material from the roll, severing means to sever said material after it is drawn from the roll and means to increase the speed of travel of one of said spaced supports with relation to the following support adjacent to the point of delivery of the strip section.

11. In a device for withdrawing strips of tacky material from a supply roll, a support for the roll, a feeding and measuring element having transverse strip carriers adapted to engage the tacky side of the strip by means of the tackiness of the strip alone, means for adhering the strip to at least two carriers, means for advancing the carriers with the strip adhered thereto to feed strip from the roll, means for freeing the strip from one of said carriers and for moving a carrier with the strip still adhering thereto and presenting the free end of the strip exteriorly of the machine.

12. In a dispenser of the class described, a feed element having a series of angularly spaced feed surfaces to which is applied a continuous length of pressure adhesive tape through successive contact of said surfaces with said continuous length of tape incidental to revolution of said feed element, a cutter for cutting said tape into short sections with each section adhering to at least one of said feed surfaces, and means of connection between said feed element and said cutter whereby said cutter cuts the tape adhering to said surfaces into successive short sections as said feed element is revolved, said short sections when cut being adapted to adhere to at least one of said feed surfaces for ready removal therefrom.

13. In a dispenser of the class described, a feed element having a series of angularly spaced feed surfaces to which is applied a continuous length of pressure adhesive tape through successive contact of said surfaces with said continuous length of tape incidental to revolution of said feed element, a cutter for cutting said tape into short sections, means of connection between said cutter and said feed element for moving said cutter successively against the tape sections secured to said feed surfaces as said feed element is revolved, whereby to cut said length of tape into sections and with each of said tape sections secured to at least one of said feed surfaces for ready removal therefrom.

14. In a dispenser of the class described, a feed element having a series of spaced tape feed surfaces to each of which is adapted to adhere an adhesive tape for feeding by revolution of said element, a cutter for cutting the tape fed by said surfaces, and means for moving said cutter to cut said tape as said feed element is revolved to feed said tape.

15. In a dispenser for lengths of pressure adhesive tape, in combination, tape feeding means comprising a feed element having a series of spaced feed surfaces to which is applied a continuous length of pressure adhesive tape through successive contact of said surfaces with said continuous length of tape incidental to the travel of said feed element, means supporting said feed element so that said surfaces will travel in an orbital path, and cutting means for cutting said tape into short sections with each section adhering to at least one of said surfaces, said feeding means being constructed and arranged to cause the cutting means to act in timed relation to the advancement of the feed element to cut the tape adhering to said surfaces into successive short sections.

16. In a dispenser of the class described, a feed element having a series of spaced tape feed surfaces to each of which is adapted to adhere an adhesive tape for feeding by revolution of said element, cutting means for cutting the tape fed by said surfaces, and means for causing the cutting means to cut said tape in timed relation to the movement of the feed element to feed the tape.

17. An apparatus for serving sections of a strip of tacky material including a support for a roll of the material, a feeding and delivering element having a plurality of spaced supports for said strip having strip engaging surfaces, said strip being adapted to adhere to said strip engaging surfaces by means of its tackiness alone, said element being movable in a direction to draw strip material from the roll, severing means to sever said material after it is drawn from the roll, and means to present a free end of the severed strip for removal of the strip while another part of the strip is adhesively secured to at least one of said supports.

18. In a device for delivering strips of tacky material from a roll, a support for the roll, a feeding and measuring element in the form of an endless belt having at least two spaced transverse strip engaging supports to which the strip is adapted to adhere by its own tackiness alone, severing means to sever the strip between said supports whereby the severed strip length is presented for removal adhesively secured to a strip support in advance of the place of severance.

19. A tape dispenser for a sticky surfaced tape comprising means for rotatably supporting a supply roll of tape, a severing member, means for pulling said tape in strip form from said roll and adapted to carry the same past said severing member where it is cut into short lengths, and adapted to deliver said short lengths to a position for removal from the dispenser, said means including spaced members movable in spaced relationship, means for directing said tape toward said member so that the sticky surface thereof is pressed into adhesive contact with said spaced members to be supported thereby at spaced intervals longitudinally thereof, whereby each member supports a severed length of said tape due to the adhesion between the two.

20. A tape dispenser for a sticky surfaced tape comprising means for rotatably supporting a supply roll of sticky surfaced tape, a severing member, and means for pulling said tape from said roll in a strip and carrying said tape in strip form past said severing member where it is adapted to be cut into short lengths, and adapted to deliver said short lengths to a position remote from the severing member for removal from the dispenser, said means including a movable feeding member having a plurality of spaced tape supporting surfaces and means for directing said tape toward said member so that the sticky surface thereof is pressed into adhesive contact with said supporting surfaces whereby the adhesion between the tape and said supporting surfaces in combination with the movement of said supporting surfaces serves to pull the tape from said roll, support it during the severing operation, and deliver the cut lengths to a position for removal from the dispenser.

21. In a machine for dispensing lengths of pressure sensitive adhesive tape, in combination, a feed device for drawing the tape from a source of supply, said device including a plurality of spaced adhesion surfaces of sufficient area to provide effective tape adhesion and means supporting and driving said adhesion surfaces in an orbital path, and means for severing the leading end of the tape to separate it from one of two adjacent surfaces to which it is adhered, whereby the adhered severed length is provided with a free end for facilitating its removal.

22. In a machine for dispensing lengths of pressure sensitive adhesive tape, in combination, a movable feed device for drawing the tape from a source of supply, said device including a plurality of surfaces spaced in the direction of movement of the feed device, each of sufficient area to provide effective tape adhesion, and a presser disposed in opposition to the said device for pressing the tape against said surfaces one after another as the feed device is advanced.

23. In a machine for dispensing lengths of pressure sensitive adhesive tape, in combination, a movable feed device for drawing the tape from a source of supply, said device including a plurality of surfaces spaced in the direction of movement of the feed device, each of sufficient area to provide effective tape adhesion, a presser disposed in opposition to the said device for pressing the tape against said surfaces one after another as the feed device is advanced, and means for severing a length at the leading end of the tape between adjacent surfaces, said severed length being supported in position for removal by at least one of said surfaces.

24. A tape dispenser for sticky surfaced tape comprising, means for supporting a supply of tape, a tape carrying member having a broken surface, means for directing the tape from said roll into adhesive contact with said broken surface to thereby connect said tape to said member by adhesive between the two and whereby said tape is engaged and supported at spaced intervals, a knife member reciprocally mounted adjacent said carrying member and adapted to move across the plane of the supporting surface of said carrying member and into the broken areas thereof to cut the tape supported on said carrying member, means for advancing said carrying member step by step for advancing succeeding broken areas into the path of said knife, and means associated with the advancing means for said carrying member for reciprocating said knife when a broken area of said carrying member is located in the path of said knife.

25. A tape dispenser for a sticky surfaced tape comprising means for rotatably supporting a supply roll of tape, a shearing member, means for pulling said tape in strip form from said roll and adapted to feed the same past said shearing member, said means including a movable feed element having spaced tape engaging members thereon adapted to engage the sticky surface of said tape at spaced intervals with sufficient adhesion to pull the tape from said supply roll and feed the same past said shearing member, means for directing the tape toward said spaced members and into adhesive contact therewith, and including a member adapted to hold that portion of the tape approaching the shearing member on said members during the shearing operation, and means for intermittently advancing said feed element whereby a given length of tape supported by said spaced members is moved past said shearing member.

26. An apparatus for serving sections of a strip of tacky material including a support for a roll of the material, a feeding and delivering element having a plurality of spaced supports for said strip having strip engaging surfaces, said strip being adapted to adhere to said strip engaging surfaces by means of its tackiness alone, said element being movable in a direction to draw strip material from the roll, severing means to sever said material after it is drawn from the roll, and means to produce relative movement between certain of said spaced supports to present the severed strip for removal adhesively secured to at least one of said supports.

RALPH E. ENGBERG.

REFERENCES CITED

The following references are of record in the file of this patent:

UNITED STATES PATENTS

| Number | Name | Date |
|---|---|---|
| 280,178 | Hoyer | June 26, 1883 |
| 495,892 | Keep | Apr. 18, 1893 |
| 2,274,623 | Hawkins | Feb. 24, 1942 |